United States Patent
Mistro (10) Patent No.: US 8,565,802 B2
(45) Date of Patent: *Oct. 22, 2013

(54) METHOD AND SYSTEM FOR AUTOMATICALLY DEKEYING A TALK GROUP SPEAKER TO JOIN A MULTI-GROUP COMMUNICATION

(75) Inventor: John T. Mistro, Carol Stream, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 405 days.

This patent is subject to a terminal disclaimer.

(21) Appl. No.: 12/944,079

(22) Filed: Nov. 11, 2010

(65) Prior Publication Data

US 2012/0122510 A1    May 17, 2012

(51) Int. Cl.
*H04M 3/00* (2006.01)

(52) U.S. Cl.
USPC .......................... 455/519; 455/520; 455/521

(58) Field of Classification Search
USPC ........... 455/518–521, 515–517; 370/327, 329
See application file for complete search history.

(56) References Cited

U.S. PATENT DOCUMENTS

| | | | |
|---|---|---|---|
| 5,634,197 A | 5/1997 | Paavonen | |
| 2004/0002351 A1* | 1/2004 | Upp et al. | 455/519 |
| 2006/0105793 A1 | 5/2006 | Gutowski et al. | |
| 2008/0057992 A1* | 3/2008 | Griffin | 455/518 |
| 2008/0096503 A1 | 4/2008 | Economy et al. | |
| 2008/0167062 A1 | 7/2008 | Gilbert et al. | |

FOREIGN PATENT DOCUMENTS

| | | |
|---|---|---|
| EP | 1734772 A2 | 12/2006 |
| FR | 2880760 A1 | 7/2006 |

OTHER PUBLICATIONS

International Search Report for International Patent Application No. PCT/US2011/056074 dated Jan. 30, 2012.

* cited by examiner

*Primary Examiner* — Nay A Maung
*Assistant Examiner* — Angelica M Perez
(74) *Attorney, Agent, or Firm* — Barbara R. Doutre (57) ABSTRACT

A radio communication system supports talk group communication and multi-group communication. Upon initiating a multi-group communication, the system causes any active talk group speakers in the talk groups included in the multi-group to dekey by changing the identifier in a monitored control channel of the talk group from the identifier of the present talk group speaker to a different value.

18 Claims, 6 Drawing Sheets

METHOD AND SYSTEM FOR AUTOMATICALLY DEKEYING A TALK GROUP SPEAKER TO JOIN A MULTI-GROUP COMMUNICATION

FIELD OF THE INVENTION

This disclosure relates generally to radio communication systems, and more particularly, to a system and method for interrupting a transmitting communication unit in a communication system.

BACKGROUND OF THE INVENTION

Two-way radio communication systems typically include a plurality of dispatch consoles and communication units, such as mobile or portable radio subscriber units, that are geographically distributed among various base sites and dispatch sites. The communication units wirelessly communicate with the base sites and each other, and are often logically divided into various talkgroups. Each talkgroup organizes a number of subscriber units into a one-to-many communication scheme where, when one person talks (transmits) in the talkgroup, all others in the talkgroup hear the speaker. Talkgroups can be included in one or more multi-groups. A multi-group is an organization of several talkgroups, and when one person talks in the multi-group, every subscriber available in each talkgroup of the multi-group will hear the multi-group speaker. Communication systems can be organized as trunked systems, where a plurality of radio frequency (RF) communication resources are allocated amongst multiple users or groups by assigning the base sites and RF channels within a coverage area on a call-by-call basis, or as conventional (non-trunked) systems where RF communication resources are dedicated to one or more users or groups. In trunked systems, or in mixed trunked and conventional systems, there is usually provided a central controller/server (sometimes called a "zone controller") for allocating RF communication resources among a group of sites. The zone controller may reside within a single device or multiple devices and may be located at a fixed equipment site or may be distributed among the base sites.

Calls among the communication units are typically of the dispatch type, or better known as push-to-talk (PTT). Each time a communication unit is keyed to begin a call, the call is assigned to an available wireless channel. The originating communication unit begins transmitting on the assigned channel and continues to transmit on the assigned channel until the communication unit has been dekeyed (de-keyed) by the user. Other communication units in an associated talkgroup also switch to the assigned channel and begin listening to the call.

In current communication systems communication units initiating a talkgroup call continue transmitting while the communication unit remains "keyed" (the transmit button pressed to transmit). This often results in a problem if there is a need to stop a communication unit from transmitting before it has dekeyed. For example, if a dispatch operator needs to transmit an urgent call, or if a multi-group call is initiated that has priority over the talkgroup call, there is no way to signal the transmitting communication unit to stop transmitting and listen to the call from the dispatch site or multi-group caller.

Accordingly, there is a need for a system and method for interrupting a transmitting half-duplex communication unit during the transmission of a call.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

In a radio communication system which supports talk group and multi-group communication, user's who are presently speaking in a talk group communication can be automatically dekeyed to force them to stop transmitting upon commencement of a multi-group communication by another user. During the talk group communication, when a user is speaking into the talk group communication, that user's radio identifier is transmitted on a monitored control channel that is monitored by all talk group member during the talk group communication, in addition to receiving the voice traffic of the talk group communication. When the multi-group communication is commenced, the talk group controller(s) supporting the talk groups included in the multi-group change the identifier in the monitored control channel that is used to identify the present speaker. While the present speaker is speaking, then, the present speaker's radio, since it is also monitoring the monitored control channel, will detect the change of the identifier to a value other than its own identifier, causing the radio to dekey, whereupon the radio will check another control channel for multi-group communication channel information to join the multi-group communication.

Figure 1:
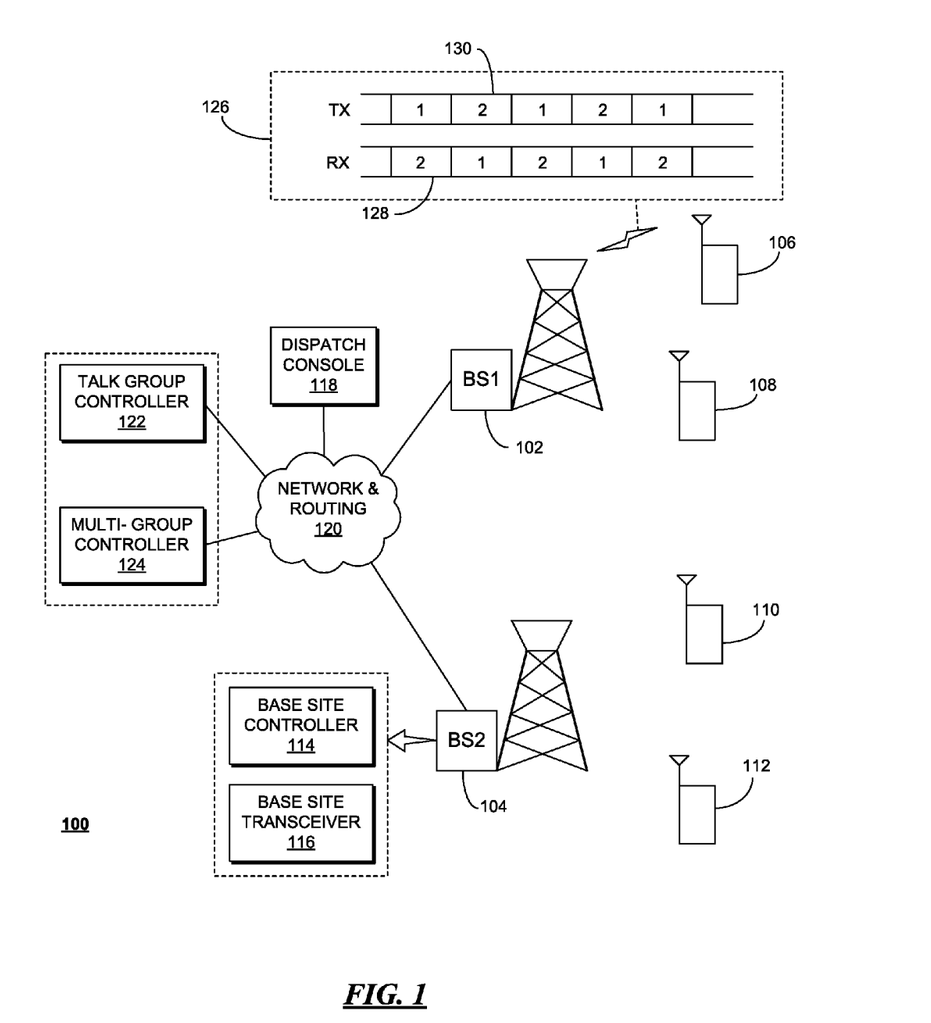
FIG. 1 shows a radio communication system schematic diagram, in accordance with an embodiment.

Referring to FIG. 1, there is shown a radio communication system 100 schematic diagram, in accordance with an embodiment. The radio communication system generally supports two-way or half-duplex radio communication, such commonly used by police, fire, fleet, and other such organizations. The system 100 utilizes a plurality of base stations or base sites 102, 104, which establish an air interface for subscriber radios in the vicinity of the base site. Subscriber radios, such as radios 106, 108, 110, 112, communicate with the base site with which they are affiliated, as controlled by the base site. The base site assigns channels, broadcasts control information, and can act as a radio-to-land line interface point. Each base site comprises a base site controller 114 and a base site transceiver 116, along with antennas, power equipment, and other such conventional components, as is known. The base site controller administers operation of the radio interface and keeps track of information necessary for such operation. The base site transceiver includes the radio equipment for modulation and demodulation, frequency generation, timing, and so on.

Each subscriber radio comprises a radio transceiver, interface means for operating the radio such as buttons, adjustment knobs, graphical display, as well as audio processing circuitry, memory, and other circuitry and software necessary for operation. Generally, a subscriber radio has a push to talk (PTT) button for commencing transmission to a selected party, talk group, or multi-group. Each radio also has a unique identifier that it uses in communication activity so that the system can identify and address it.

The base sites are networked through a routing network 120 which can carry voice and data traffic as well as control signaling and other network administration information. One or more dispatch consoles 118 can be connected to the system to allow a dispatcher or other agent to communicate with users operating the subscriber radios 106-112. The dispatch console is a generally a fixed station which interacts with the communication system over wire line, rather than a radio interface. The system 100 further comprises a talk group controller 122 and a multi-group controller 124, which may be implemented as separate equipment components which are located separately or they can be co-located. They can also be integrated into one or more communication agent processing components.

The talk group controller 122 facilitates talk group communication where one speaker (radio) is heard by all available members of the talk group. Talks groups can be defined by a record of the subscriber radio identifiers associated with users to be included in the talk group. When a member of the talk group initiates a talk group communication, a request is received by the talk group controller. The talk group controller then determines the membership of the talk group, and informs the base sites of the talk group communication. The base sites in turn alert talk group members via a broadcast control channel and indicate a channel assignment over which the base site will transmit talk group communication voice traffic. For example, subscriber radio 106 can initiate a talk group communication with talk group member radios 108, 11, and 112. In response, BS1 102 and BS2 104, response to the talk group controller 122, assign outbound channels for the talk group communication traffic so that subscriber radios 108, 112, and 112 can receive the talk group communication traffic. Thus, as subscriber radio 106 transmits, on an inbound channel, to BS1 102, the voice data is routed from BS1 102 to the network, where it is duplicated and re-routed to base sites which have talk group members. In the present example the inbound talk group communication from radio 106 is routed back to BS1 102 to be transmitted to subscriber radio 108, and it is routed to BS2 104 to be transmitted to subscriber radios 110, 112 on assigned outbound traffic channels.

In addition to transmitting talk group communication voice traffic, each base station also transmits the identifier of the present speaker of the talk group on a monitored control channel. The present speaker is the talk group member that is presently speaking (transmitting) in the talk group communication, and can be the initiator of the talk group communication, or a subsequently speaking member of the talk group communication. The monitored control channel is a control channel that is monitored by the talk group members during the talk group communication, including the present speaker. When a different speaker begins speaking, the radio identifier or other identifier associated with that user is changed and transmitted in the monitored control channel to identify the speaker. Accordingly, while a user is transmitting, the user's radio will be receiving its own identifier over the monitored channel while the user continues to transmit. The talk group communication channel assignments are maintained for a period after each speaker releases the talk group by dekeying. Dekeying refers ceasing transmitting by the radio, which occurs, in one way, upon the user releasing the PTT button at the user's radio. If there is no transmission by any talk group member upon expiration of the period, then the system 100 will release all assigned channels to make them available for other communication activity.

The multi-group controller 124 facilitates multi-group communications. A multi-group is a group of talk groups, meaning the communication joins multiple talk groups into one multi-group. A multi-group can be a collection of talk-groups across the system, a site-wide grouping of all users at a site, or system-wide grouping of all talk groups defined at the talk group controller 122, or all system users. The multi-group controller maintains a record of the defined multi-groups, indicating which talk groups are to be included in communication for each defined multi-group. The multi-group controller can also accept dynamically created multi-group definitions from users.

To initiate a multi-group communication, a multi-group communication request can be received at the multi-group controller 124. The multi-group controller can, in response to the request, inform the talk group controller of the multi-group communication. In response, the talk group controller can hold the talk groups, so that new talk group requests for any talk groups included in the multi-group are refused. The multi-group controller 124 forwards the multi-group requester's identifier to either the talk group controller 122, which in turn forwards it to the base sites, or it can forward the identifier directly to the base sites in setting up the multi-group communication. The talk group controller can indicate to the base sites which subscriber radios are involved in the multi-group communication based on talk group membership. The base sites can then assign channels for the multi-group communication, and broadcast the multi-group communication and channel assignment over a broadcast control channel. In addition, for any talk group communications that are presently active, and which are for talk groups included in the multi-group, the base sites change the identifier of the present speaker from the present talk group speaker to the identifier of the multi-group requester, or some other indicator, in the monitored control channel associated with the talk group communication. By changing the identifier from the present talk group speaker, all subscriber radios in the talk group, including the speaker, will detect the change of identifier to indicate to those keyed up radios that a multi-group communication is imminent. Since, according to the invention, the present speaker of a talk group communication monitors the monitored control channel, the present speaker's radio will detect the change of identifier as not being its own identifier, and can automatically dekey (de-key) and cease transmission, even though the user of the radio may still be holding the PTT button down as if transmitting.

The subscriber radios can use a time division multiple access (TDMA) channel scheme 126. An inbound channel 130 and outbound channel 128 operate on different frequencies as a frequency pair. Since the inbound and outbound channels are time division multiplexed, the subscriber radio can both transmit and receive with the same transceiver. In a 2 to 1 TDMA scheme, as shown, there can be 2 separate communications occurring at the same time. A first communication can occur in time slots labeled "1" and a second communication can occur in time slots labeled "2." Accordingly, the transmitting subscriber radio alternates between transmitting and receiving. In non-TDMA scheme the subscriber radio will require a second transceiver to receive at the same time. In one embodiment, the monitored control channel can be formed as a sub-channel in the outbound channel.

Figure 2:
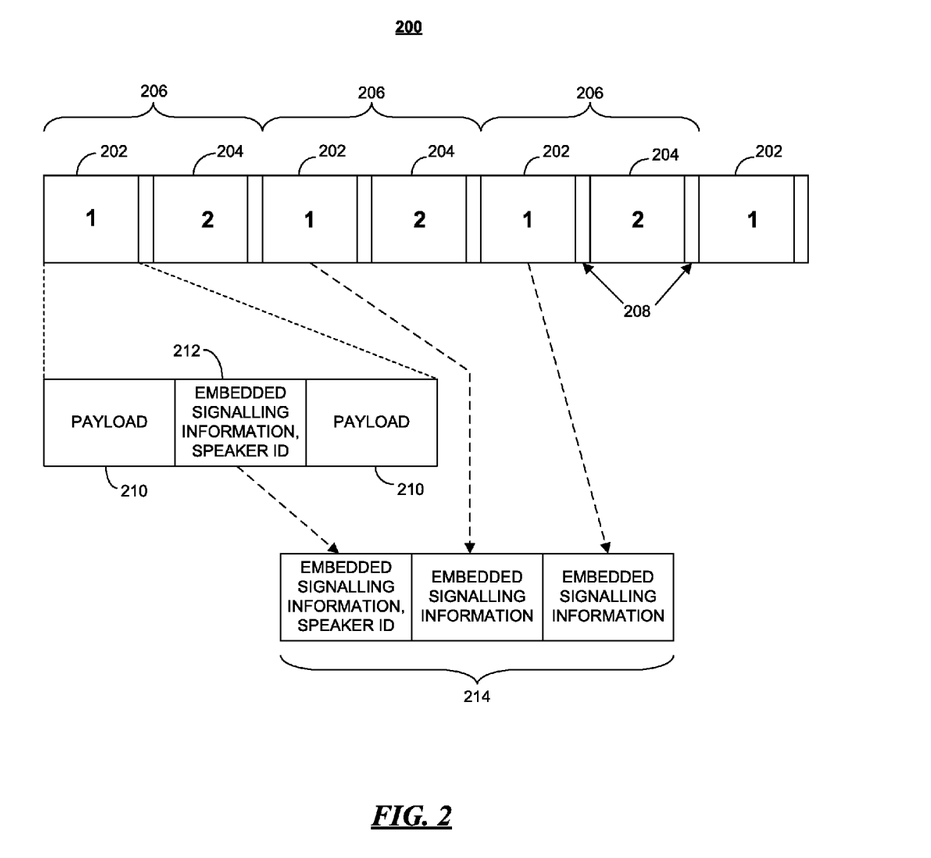
FIG. 2 shows a channel diagram of a monitored channel, in accordance with an embodiment.

FIG. 2 illustrates one exemplary embodiment of a TDMA signal that may be used for transmitting call information in accordance with the present disclosure. Generally, each frequency carrier in a TDMA signal is divided into numerous time slots or communication streams. In FIG. 2, the TDMA signal is illustrated having two time slots. However, it is understood that a TDMA signal in accordance with the present disclosure could also have any number of time slots, such as 4, 8, 16 or any other potential number of time slots.

The 2-slot TDMA frame 200 is divided into two separate time slots, which are respectively labeled as "1" and "2." Each time slot is then further divided into discrete information packets (also referred to as "bursts") 202 and 204 corresponding to a specific amount of information. For example, each burst 202 and 204 can be approximately 27.5 ms long and represents about 60 ms of voice information, in accordance with existing systems.

The bursts 202 from the first time slot 1 and the bursts 204 from the second time slot 2 are interleaved and offset in time such that only bursts from a single time slot are transmitted at any one time. A single TDMA frame 206 is defined as comprising one burst from each time slot 1 and 2.

As shown in FIG. 2, sub-slots 208 may also be provided between each of the bursts. For outbound signals, the sub-slots 208 typically include a common announcement channel (CACH) signal for channel management as well as call control signaling.

In the present embodiment, each time slot 202, 204 is further comprised of a payload 210 and an embedded signaling information field 212 which can be centered within the payload 210. The payload 210 can include call information such as voice, data, video, or the like. The embedded signaling information field 212 may include various types of embedded signaling information such as synchronization patterns, error correction information, link control signals, or the like. If the payload 210 is encrypted, the embedded signaling information 212 may also include message indicator (MI) encryption synchronization words, key identification information, or algorithm identification information and the identifier of the present speaker of the talk group communication. The function of these types of embedded signaling information is well known in the art.

When a subscriber radio 106, 108, 110, or 112 is keyed to initiate a talk group communication, a talk group controller assigns the talk group communication to an available wireless communication channel. In one embodiment, the communication channel may be comprised of an outbound link for transmissions from the base site to the subscriber radios and an inbound link for transmissions from the subscriber radios to the base site. For example, in a TDMA system, the outbound link may be comprised of one or more time slots (also referred to as outbound time slots) and the inbound link may be comprised of one or more other time slots (also referred to as inbound time slots). The time slots used for the inbound and outbound links may also be on the same frequency channel or on different frequency channels.

The channel assignment is then advertised to the subscriber radios via one or more control channels. In one exemplary embodiment, the channel assignment may be advertised via a dedicated, or broadcast, control channel that is used by one or more base sites for transmitting various call initiation signals and identification codes. In other embodiments, however, the communication system may not include a dedicated control channel, in which case, communication traffic may be delivered on any communication channel in the communication system.

Upon receiving the channel assignment, a subscriber radio which requested the call begins transmitting call information to the base site to which it is presently affiliated using the inbound link of the assigned communication channel. Other subscriber radios authorized to receive the transmitted call (i.e., subscriber radios in the same talkgroup) also obtain the channel assignment and begin listening to the talk group communication on the outbound link of the communication channel. For purposes of this disclosure, a subscriber radio that is transmitting on the inbound link is referred to as a present speaker while a subscriber radio that is listening on an outbound link is referred to as a listener or listening talk group member. In accordance with the present disclosure, the present speaker is also configured to monitor a monitored control channel. The monitored control channel can be provided in the outbound link. More particularly, in a TDMA system, the present speaker transitions to an outbound time slot during the times when the present speaker is not transmitting on an inbound time slot, and obtains the embedded signaling information from the TDMA bursts broadcast on the outbound time slot.

Each outbound TDMA period can contain a portion of a frame of a monitored control channel frame 214. As each outbound TDMA frame is received, the receiving subscriber radios, including the present speaker, buffer the control information in each TDMA outbound time slot and can assemble the control information at the receiving subscriber radio. The present speaker identifier can be carried in one out several outbound TDMA slots, rather than having to be present in every outbound TDMA time slot.

Figure 3:
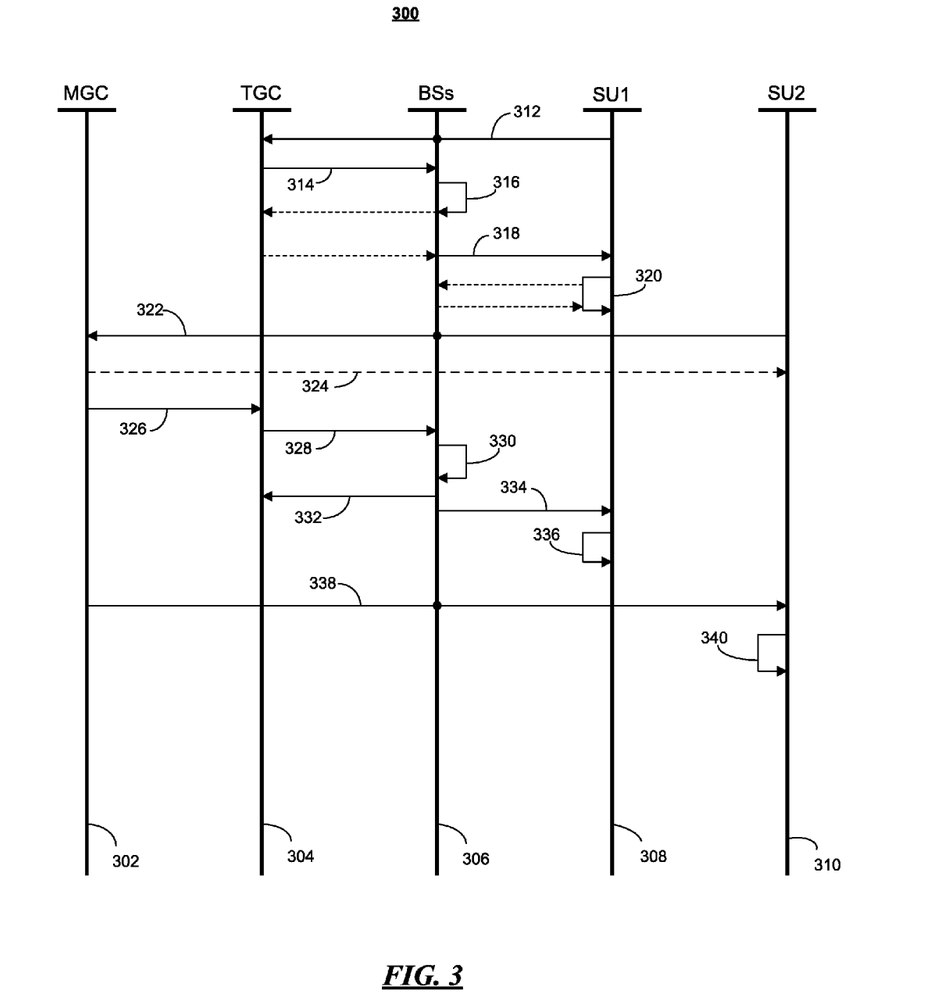
FIG. 3 shows a signal flow diagram for dekeying a talk group speaker radio to join a multi-group communication, in accordance with an embodiment.

FIG. 3 shows a signal flow 300 diagram for dekeying a talk group speaker radio to join a multi-group communication, in accordance with an embodiment. The principal system components are the multi-group controller (MGC) 302, the talk group controller (TGC) 304, the plurality of base sites (BSs) 306, a first subscriber radio unit (SU1) 308, and a second subscriber radio unit (SU2) 310. The process begins with the first subscriber radio unit 308 initiating a talk group communication by sending a talk group request 312 to the talk group controller 304. The talk group controller, in turn, indicates the imminent talk group communication to the base sites 306 that are required for the talk group communication, which includes all base sites which have talk group members presently affiliated. The base sites then set up 316 channel resources for the talk group communication and can confirm talk group communication readiness to the talk group controller 304. The talk group communication can then be granted 318. The base site controller affiliated with the requesting subscriber radio 308 can wait for an indication from the talk group controller 304 before commencing the talk group communication to assure all base sites involved in the talk group communication have responded. The talk group communication commences by advertising a channel assignment for the talk group on a dedicated or broadcast control channel monitored by the subscriber units. Upon seeing a talk group identifier corresponding to a talk group to which the subscriber radio belongs, the subscriber radio tunes to the assigned channel to begin receiving the talk group communication. Likewise, the requester (SU1 308) can then commence transmitting on the assigned inbound channel, and the talk group communication commences conventionally 320, as supported by the base sites.

During the talk group communication, a second subscriber radio 310, which may not be involved with the talk group communication 320, initiates a multi-group communication by transmitting a multi-group communication request 322 to the multi-group controller 302. The multi-group controller can verify that the requester is allowed to initiate the multi-group call, and then grant 324 the multi-group request. Alternatively, the multi-group controller can delay granting the multi-group request to further set up the multi-group communication. Upon receiving a valid multi-group communication request, the MGC 302 informs 326 the TGC 304. The TGC 304 informs 328 the base sites 306, which allocate 330 channel resources for the multi-group communication. The base sites can respond 332 to the TGC 304 to indicate acknowledgement of the imminent multi-group communication.

To end active talk group communication, each base site presently supporting a talk group communication for a talk group included in the multi-group changes the identifier in the outbound monitored control channel 334 of the talk group communications. The identifier can be changed from the identifier of the present speaker of the talk group communication to the identifier of the multi-group initiator. Since the monitored control channel is monitored by all talk group members, including the present speaker, all talk group members including the present speaker, which in the present example is SU1 308, will detect the change of the identifier. The present speaker will detect 336 the change in the identifier while speaking via the monitored control channel between transmission bursts. Upon detecting the different identifier in the monitored control channel, the present speaker can automatically dekey and cease transmitting, and optionally alert the user that the radio has been dekeyed. Alternatively, the present speaker radio can alert its user and delay dekeying for a short period of time to give the user time to finish speaking SU1 308 will then access a broadcast control channel to obtain the multi-group communication channel assignment and commence listening to the multi-group communication. The MGC 302 grants 338 the multi-group communication, and then the multi-group requester, here SU2 310, can then commence speaking 340 into the multi-group communication. The MGC can provide the multi-group communication grant (324, 338) at a selected time in response to the multi-group request. In one embodiment the MGC 302 can wait for a prescribed period of time after receiving the multi-group communication request in order to give the TGC 304 time to communicate with all base sites so that the present speakers of all active talk groups can be dekeyed.

Figure 4:
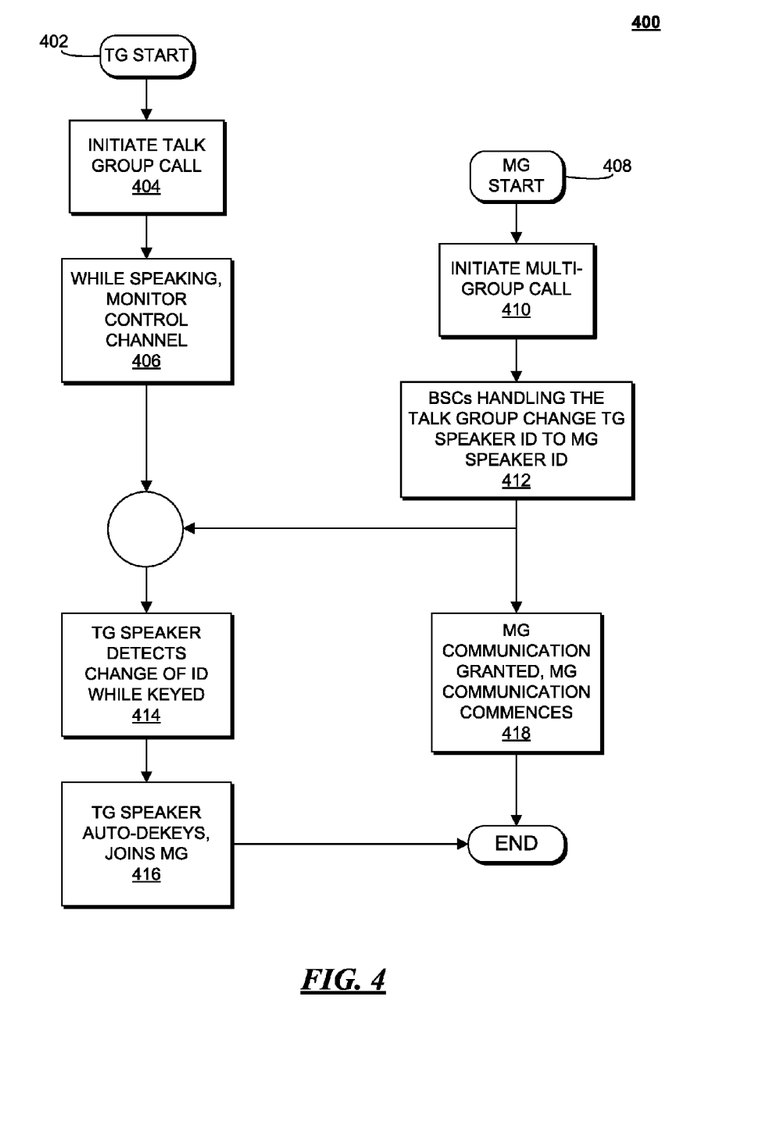
FIG. 4 shows a flow chart diagram of a method for a communication system to dekey a talk group speaker radio for a multi-group communication, in accordance with an embodiment.

FIG. 4 shows a flow chart diagram of a method 400 for a communication system to dekey a talk group speaker radio for a multi-group communication, in accordance with an embodiment. The present diagram illustrates two different starting points 402 and 408. Start point 402 is a talk group starting point, while start point 408 is a multi-group start. The talk group branch commences by a talk group requester initiating and establishing a talk group communication 404. During the talk group communication, as different radios may speak (in turn, though contention) in the talk group communication, they monitor the monitored control channel 406. Normally each radio that presently has control to transmit has its identifier placed in the monitored control channel so that while speaking the speaking radio will detect its own identifier in the monitored control channel in association with the talk group communication.

The multi-group communication commences upon initiating the multi-group communication 410, such as by transmitting a multi-group communication request to a multi-group controller. In response the request, once validated, the system causes any base sites presently supporting talk group communication activity for talk groups included in the multi-group to change the identifier in the monitored control channel associated with the talk group communication 412. As a result, the present speaker radio in each talk group communication detects the change of identifier 414, and the present speaker radio to dekey and then join the multi-group communication 416. The system grants the multi-group request 418, allowing the multi-group communication to occur with the multi-group communication requester being the first multi-group speaker. During the multi-group communication, all members of the talk groups included in the multi-group will hear the multi-group speaker.

Figure 5:
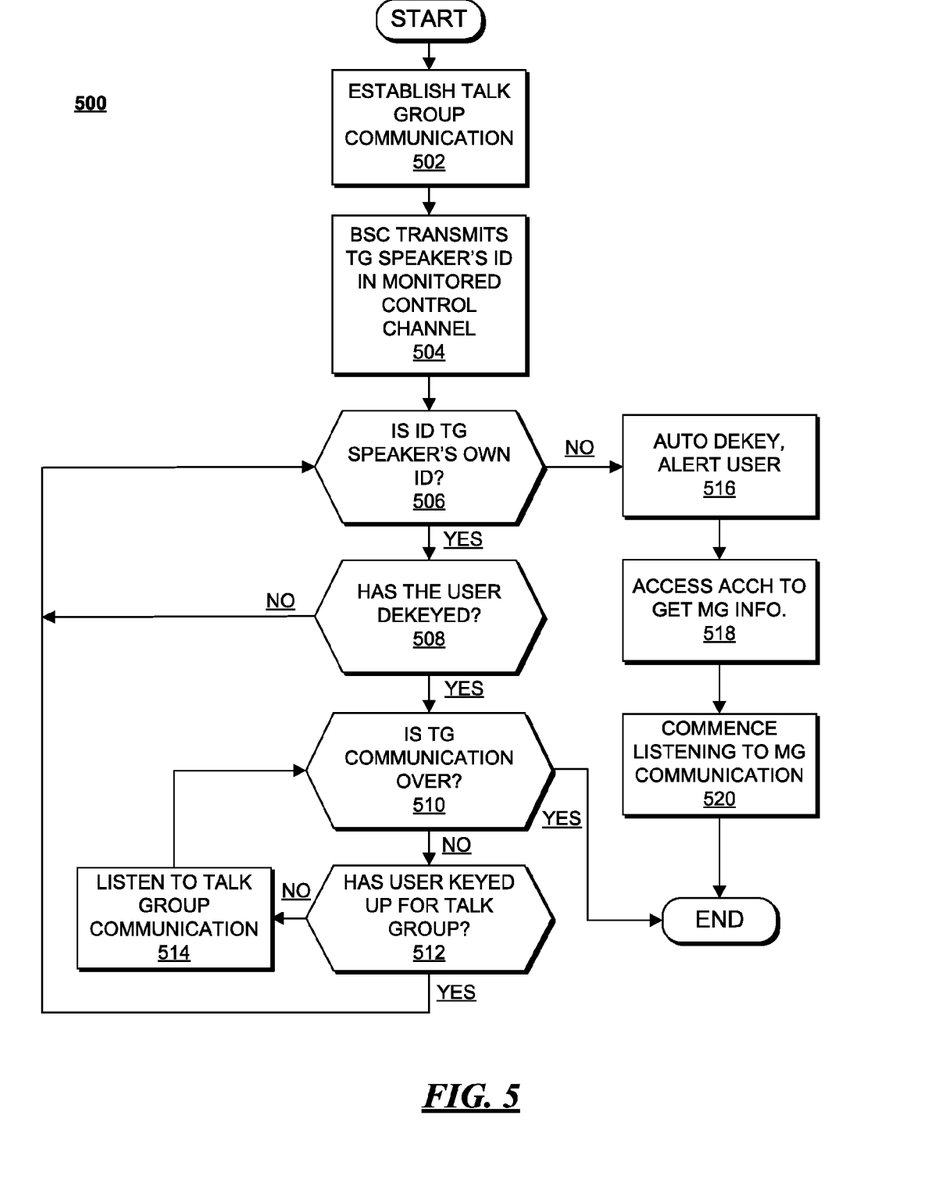
FIG. 5 shows a flow chart diagram of a method of operating a subscriber radio where the subscriber radio is automatically dekeyed during a talk group communication to join a multi-group communication, in accordance with an embodiment.

FIG. 5 shows a flow chart diagram of a method 500 of operating a subscriber radio where the subscriber radio is automatically dekeyed during a talk group communication to join a multi-group communication, in accordance with an embodiment. Upon starting a talk group communication 502, the present speaker of the talk group, which may not be the talk group communication initiator as different talk group members can take turns speaking, continues transmitting as long as the user has the radio keyed and the speaker radio's identifier is present in the monitored control channel in association with the talk group communication. The base site transmits the speaker radio's identifier in the monitored control channel 504. The present speaker's radio examines the monitored control channel to determine if its identifier is indicated as the present speaker 506. If the present speaker's radio detects its own identifier in the monitored control channel, the radio then determines if the user has dekeyed to cease transmission, and while the radio remains keyed and its own identifier is indicated in the monitored control channel, the present speaker will continue to transmit. IF the user dekeys on their own, the radio then determines whether the talk group communication is over 510. The talk group communication can end when a speaker stops speaking, and no other radio in the talk group begins speaking within a preselected period of time. IF the talk group communication is not over, the radio can listen to the talk group communication 514 while also detecting if the user has keyed up 512 to initiate transmission into the talk group communication. If the user keys up to transmit, the method loops back to monitor the monitored control channel for its own identifier 506. Otherwise the radio continues listening until the talk group communication is over.

When, while monitoring the monitored control channel 506, if the transmitting radio sees an indication that it is not the present speaker in the monitored control channel, the radio can automatically dekey and alert the user 516. The radio can then access an associated or broadcast control channel to get the multi-group communication assignment 518, and commence listening to the multi-group communication.

Figure 6:
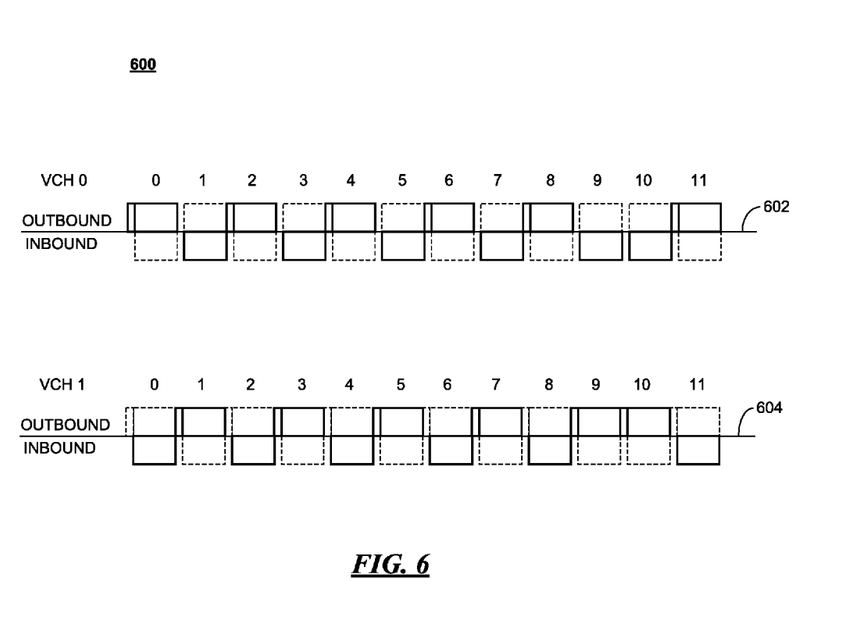
FIG. 6 shows a channel diagram of a voice channel including a monitored control channel, in accordance with an embodiment.

FIG. 6 shows a channel diagram of a voice channel 600 including a monitored control channel, in accordance with an embodiment. The present embodiment shows two voice channels, illustrated respectively by VCH0 channel diagram 602 and VCH1 channel diagram 604. Each channel occurs on the same frequency, and using TDMA, alternate their transmit and receive time slots. Thus, for VHC0, outbound time slots 0, 2, 4, 6, 8, and 11 are highlighted in channel diagram 602 since these outbound time slots are the outbound time slots for one channel, while the remaining outbound time slots 1, 3, 5, 7, 9, and 10 are highlighted on channel diagram 604 being the outbound time slots for the other channel, VH1. The time slots not used by the respective channels are shown in dashed line. The channel configuration shown can be compliant with the P25 phase 2 two-slot TDMA channel configuration for the APCO 25 standard. The outbound and inbound frequencies can be separated by 12.5 kHz, and use time slots that are 30 millisecond (msec) long. A superframe contains 12 consecutive 30 msec time slots for a total duration of 360 msec per superframe. As indicated, the slots are numbered 0-11. Slots 10 and 11 are inverted in time and used for signaling. The first 10 slots in a superframe, 0-9, can be used for voice traffic, or signaling information. If used for signaling, they are referred to as a fast associated control channel (FAACH). The last two slots 10 and 11, can only be used for signaling, and are referred to as a slow associated control channel (SACCH). Both the FACCH and SACCH are monitored control channels and could carry the identifier of the present speaker during a talk group communication. Since the SACCH does not affect voice traffic throughput, though, placing the present speaker identifier in the SACCH does not reduce voice quality. It is contemplated further that the present speaker identifier need not be placed in every SACCH, but rather in one out of every several superframes. In one embodiment the present speaker identifier can be placed in one out of every four superframe SACCHs.

During a talk group communication, the present speaker's identifier can be present in a SACCH, Upon the initialization of a multi-group communication which includes the talk group, the present speaker identifier will be changed. Upon the present speaker receiving a SACCH with an identifier other than the present speaker's identifier, the present speaker's radio can automatically dekey. If a 1:4 superframe arrangement is used for carrying the present speaker's identifier, there will be a maximum delay of 360 msec×4=1440 msec before the present speaker's radio detects the change.

Accordingly, those of ordinary skill in the art will realize that there are a variety of arrangements and embodiments of the invention, including, for example, a method for commencing a multi-group communication in a radio communication system, which can be commences by establishing at least one talk group communication in one of a plurality of talk groups included in the multi-group. During the talk group communication the method includes transmitting, in a control channel associated with each talk group communication and monitored by all available members of the talk group during the talkgroup communication including a present speaker in the talk group communication, an identifier of the present speaker of the talk group communication. While the talk group communication is in progress, the method can include receiving a multi-group communication request at a multi-group controller from a multi-group requestor, the multi-group requestor having an identifier. The method then commences by changing the identifier of the present speaker in the control channel of each talk group communication to the identifier of the multi-group requestor thereby causing all available members of each of the plurality of talk groups, including the present speaker, to abandon the talk group communication and join a multi-group. The method then commences granting the multi-group call request to the multi-group call requestor thereby commencing a multi-group communication.

The invention can also be embodied as a method of switching to a multi-group call, commenced upon initiating a talk group communication at a first subscriber radio having a first radio identifier. During the talk group communication the method includes monitoring a monitored control channel associated with the talk group communication at the first subscriber radio while the first subscriber radio is transmitting. The method further includes receiving, at the first subscriber radio, while transmitting during the talk group communication, an indicator of a present speaker of the talk group from the monitored control channel. While the indicator is the first radio identifier, the method includes continuing to transmit in the talk group communication. When the indicator changes to a second radio identifier, the method includes ceasing transmitting and accessing a broadcast control channel to determine a multi-group channel assignment corresponding to the second radio identifier.

Another embodiment can include a radio communication system having a plurality of base sites, each base site including a base transceiver and a base controller which establish an air interface for subscriber radios in range of the base site, The system further includes at least one talk group controller in communication with each of the plurality of base sites which provides talk group communication information to the base sites to facilitate a talk group communication, including a talk group speaker identifier of a present talk group speaker which is transmitted by the base sites in the talk group communication in a monitored control channel monitored by all subscriber radios involved in the talk group communication. The system can further include at least one multi-group controller in communication with each of the plurality of base sites and the at least one talk group controller which provides multi-group communication information to the at least one talk group controller and base sites responsive to a multi-group communication request to facilitate a multi-group communication, the multi-group communication including a plurality of talk groups and providing a multi-group speaker identifier to the at least one talk group controller corresponding to a subscriber radio from which the multi-group communication was received. Wherein, the system, in response to the multi-group controller providing the multi-group speaker identifier, the at least one talk group controller changes the talk group speaker identifier to the multi-group speaker identifier thereby causing a present speaker in each talk group included in the multi-group to automatically dekey and join the multi-group communication.

This invention can be embodied in other forms without departing from the spirit or essential attributes thereof. Accordingly, reference should be made to the following claims, rather than to the foregoing specification, as indicating the scope of the invention.

What is claimed is:

1. A method for commencing a multi-group communication in a radio communication system, comprising:
   establishing at least one talk group communication in one of a plurality of talk groups included in the multi-group;
   transmitting, in a monitored control channel associated with each of the at least one talk group communication and monitored by all available members of the one of the plurality of talk group during the talkgroup communication including a present speaker in the at least one talk group communication, an identifier of the present speaker of the at least one talk group communication;

receiving a multi-group communication request at a multi-group controller from a multi-group requestor, the multi-group requestor having an identifier;

changing the identifier of the present speaker in the monitored control channel of each of the at least one talk group communication to the identifier of the multi-group requestor thereby causing all available members of each of the plurality of talk groups, including the present speaker, to abandon the at least one talk group communication and join a multi-group communication; and granting the multi-group communication request to the multi-group call requestor thereby commencing the multi-group communication.

2. The method of claim 1, wherein granting the multi-group request occurs after a delay period subsequent to changing the identifier.

3. The method of claim 1, wherein transmitting in the monitored control channel comprises transmitting in a monitored control channel embedded in an outbound voice channel of the talk group communication.

4. The method of claim 3, wherein transmitting in the monitored control channel embedded in the outbound voice channel comprises transmitting in a slow associated control channel in the outbound voice channel.

5. The method of claim 1, wherein each talk group is supported by at least one base site, the method further comprises transmitting, in conjunction with changing the identifier, a multi-group channel assignment in a broadcast control channel of each base site supporting each talk group included in the multi-group.

6. The method of claim 1, wherein establishing the at least one talk group comprises assigning the at least one talk group to a time division multiple access (TDMA) channel pair.

7. A method of switching to a multi-group call, comprising:
initiating a talk group communication at a first subscriber radio having a first radio identifier;
monitoring a monitored control channel associated with the talk group communication at the first subscriber radio while the first subscriber radio is transmitting;
receiving at the first subscriber radio, while transmitting during the talk group communication, an indicator of a present speaker of the talk group from the monitored control channel;
while the indicator is the first radio identifier, continuing to transmit in the talk group communication; and
when the indicator changes to a second radio identifier, ceasing transmitting and accessing a broadcast control channel to determine a multi-group channel assignment corresponding to the second radio identifier.

8. The method of claim 7, wherein ceasing transmitting occurs after a delay period subsequent to the indicator changing to the second radio identifier.

9. The method of claim 7, wherein monitoring the monitored control channel associated with the talk group communication comprises monitoring the monitored control channel embedded in an outbound voice channel of the talk group communication.

10. The method of claim 9, wherein monitoring the monitored control channel embedded in the outbound voice channel comprises monitoring a slow associated control channel in the outbound voice channel.

11. The method of claim 7, wherein monitoring the control channel comprises monitoring an outbound channel associated with a time division multiple access channel (TDMA) assigned to the talk group communication.

12. The method of claim 7, wherein accessing the associated control channel comprises accessing the broadcast control channel provided by a base station to which the first subscriber radio is affiliated for the talk group communication.

13. A radio communication system, comprising:
a plurality of base sites, each of the plurality of base sites including a base transceiver and a base controller which establish an air interface for subscriber radios in range of the each of the plurality of base sites;
at least one talk group controller in communication with each of the plurality of base sites which provides talk group communication information to the each of the plurality of base sites to facilitate a talk group communication, including a talk group speaker identifier of a present talk group speaker which is transmitted by the each of the plurality of base sites in the talk group communication in a monitored control channel monitored by all subscriber radios involved in the talk group communication;
at least one multi-group controller in communication with each of the plurality of base sites and the at least one talk group controller which provides multi-group communication information to the at least one talk group controller and each of the plurality of base sites responsive to a multi-group communication request to facilitate a multi-group communication, the multi-group communication including a plurality of talk groups and providing a multi-group speaker identifier to the at least one talk group controller corresponding to a subscriber radio from which the multi-group communication was received; and
wherein, in response to the multi-group controller providing the multi-group speaker identifier, the at least one talk group controller changes the talk group speaker identifier to the multi-group speaker identifier thereby causing a present speaker in each talk group included in the multi-group to automatically dekey and join the multi-group communication.

14. The radio communication system of claim 13, wherein the base stations provide the talk group communication on a time division multiple access channel pair having an inbound voice channel and an outbound voice channel.

15. The radio communication system of claim 14, wherein the base sites transmit the monitored control channel in the outbound voice channel assigned to the talk group communication.

16. The radio communication system of claim 15, wherein the monitored control channel in the outbound voice channel is a slow associated control channel.

17. The radio communication system of claim 13, wherein the base stations further provide a broadcast control channel which carry multi-group communication channel assignment information.

18. The radio communication system of claim 13, wherein the multi-group controller waits a period of time subsequent to receiving the multi-group communication request and then grants the request.

* * * * *